June 24, 1924.
J. R. PLANTS
ANIMAL TRAP
Filed Sept. 8, 1922
1,499,193
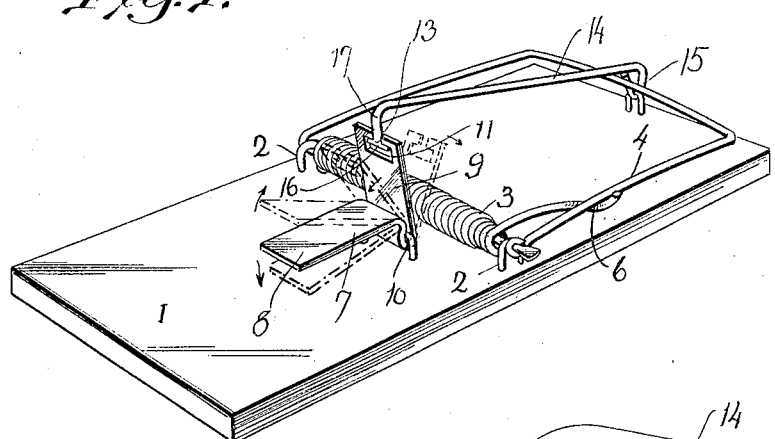
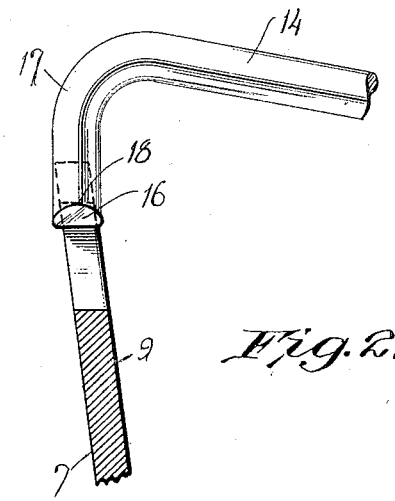
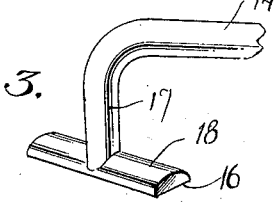
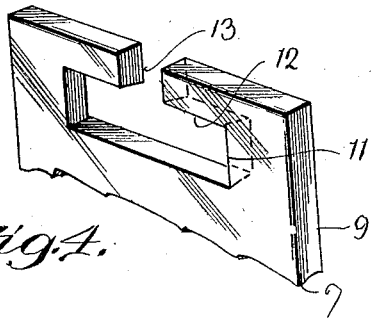
Inventor
J. R. Plants
Attorneys Patented June 24, 1924.

1,499,193

UNITED STATES PATENT OFFICE.

JAMES R. PLANTS, OF CLAYSVILLE, PENNSYLVANIA.

ANIMAL TRAP.

Application filed September 8, 1922. Serial No. 586,944.

*To all whom it may concern:*

Be it known that I, JAMES R. PLANTS, a citizen of the United States, resident of Claysville, in the county of Washington and State of Pennsylvania, have made a certain new and useful Invention in Animal Traps; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1 is a perspective view of the invention.

Figure 2 is a detail sectional view of the bait holder and the catch engaged therewith, parts being broken away.

Figure 3 is a detail perspective view of one of the parts shown in Figure 2.

Figure 4 is a detail perspective view of the other part shown in Figure 2.

The invention has relation to animal traps, particularly for catching mice and rats, and of the pivoted spring striker type, having for an object to provide means for setting the trap, that will be releasable by movement of the bait holder in either direction, upwardly or downwardly.

The invention consists in the novel construction and combinations of parts, as hereinafter set forth.

In the accompanying drawings illustrating an embodiment of the invention, the numeral 1 designates the body or platform of the trap, centrally of which is secured the coiled spring 3, the loop striker 4, having the inner ends of the longitudinal arms thereof pivotally engaging staples 2, engaged with said body of the trap, and the inner transverse arm thereof engaging said coiled spring, the latter having one end made fast to the trap body and the other end thereof engaged with an intermediate portion of a longitudinal arm of the loop striker at 6, all as common with such traps.

The bait holder 7 is also of the common pivoted type of bent strap material having a horizontally extending bait holding portion 8, and an upright arm 9 and a lower pivot 10, said arm being in a plane transverse of said base and provided at its upper end with a notch 11 having a lower wide portion and an upper narrow neck portion 13 providing horizontal spaced lugs having lower edge shoulders 12.

The wire form catch lever 14 is fulcrumed at one end to the base at 15 and has a downwardly bent depending free end provided with a lower T-head 16 the shank of which fits in the narrow neck portion 13 of said notch and the branches of which engage said lower edge shoulders 12.

In all cases, the catch lever will be released to spring the trap upon the animal upon movement of the bait holder either upwardly or downwardly as shown in dotted lines in figure, which is of obvious advantage, it being impossible for the animal to nose the bait holder up without setting off the trap.

It is preferred to form the horizontally extended branch or branches of the head of the catch with a convex rounded upper surface 18, to aid the sensitiveness of the trap.

I claim:

In an animal trap, a base having a central coiled spring, a loop-form striker pivoted at one end to the center of said base, said spring engaging said striker and being tensioned in the pivotal movement of the striker, an angular bait holder of bent strap material pivoted in the angle thereof to said base adjacent said spring and having an upright arm in a plane transverse of said base and provided at its upper end with a notch having a lower wide portion and an upper narrow neck portion providing horizontal spaced lugs having lower edge shoulders, and a wire-form catch lever fulcrumed at one end to said base and having a downwardly bent depending free end provided with a lower T-head the shank of which fits in the narrow neck portion of said notch and the branches of which fit in the wider portion of said notch and engage said lower edge shoulders.

In testimony whereof I affix my signature in presence of two witnesses.

JAMES R. PLANTS.

Witnesses:
R. A. BRAUNLEE,
WM. B. SMITH.